United States Patent
Cheng et al.

(10) Patent No.: US 8,089,559 B2
(45) Date of Patent: Jan. 3, 2012

(54) DIGITAL PHOTO FRAME WITH A PICTURE-IN-PICTURE OUTPUT FUNCTION AND METHOD THEREOF

(75) Inventors: Chia-Yu Cheng, Taipei Hsien (TW);
Li-Hua Hu, Shenzhen (CN);
Kuan-Hong Hsieh, Taipei Hsien (TW);
Han-Che Wang, Taipei Hsien (TW);
Zai-An Pan, Shenzhen (CN);
Shin-Hong Chung, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 561 days.

(21) Appl. No.: 12/343,489

(22) Filed: Dec. 24, 2008

(65) Prior Publication Data
US 2010/0053437 A1 Mar. 4, 2010

(30) Foreign Application Priority Data
Aug. 28, 2008 (CN) .......................... 2008 1 0304264

(51) Int. Cl.
*H04N 5/45* (2011.01)

(52) U.S. Cl. ......... 348/656; 348/563; 348/569; 348/734
(58) Field of Classification Search .......... 348/553–570, 348/634, 636, 638, 632, 739, 706, 734; 725/38–40, 725/46–47, 112; *H04N 5/45*
See application file for complete search history.

(56) References Cited

U.S. PATENT DOCUMENTS

| | | | |
|---|---|---|---|
| 6,272,680 B1* | 8/2001 | Gaughan et al. | 725/112 |
| 7,103,905 B2* | 9/2006 | Novak | 725/46 |
| 7,352,407 B2* | 4/2008 | Lan et al. | 348/569 |
| 7,773,156 B2* | 8/2010 | Lee | 348/565 |
| 2004/0244054 A1* | 12/2004 | Sheu et al. | 725/131 |

FOREIGN PATENT DOCUMENTS

| | | |
|---|---|---|
| CN | 1185079 A | 6/1998 |
| CN | 101022514 A | 8/2007 |

* cited by examiner

*Primary Examiner* — Trang U Tran
(74) *Attorney, Agent, or Firm* — Altis Law Group, Inc.

(57) ABSTRACT

A method for outputting multimedia files and broadcast contents of a selected television (TV) channels on the DPF in a picture-in-picture (PIP) output mode is provided. The method includes: starting the PIP output mode when the DPF plays multimedia files under a DPF mode; defining a PIP region on the DPF; receiving broadcasts of a selected TV channel; and outputting the multimedia files and the broadcast contents of the selected TV channel in the PIP output mode. A related DPF is also provided.

11 Claims, 4 Drawing Sheets

DIGITAL PHOTO FRAME WITH A PICTURE-IN-PICTURE OUTPUT FUNCTION AND METHOD THEREOF

TECHNICAL FIELD

The present disclosure relates to a digital photo frame (DPF) with a picture-in-picture (PIP) output function and method thereof.

DESCRIPTION OF RELATED ART

Along with rapid developments in electronic technology, DPFs have become familiar to consumers. Some types of DPFs have been designed not only to play image files, but also to broadcast television (TV) programs.

A great number of commercials are inserted into the TV programs. Many people dislike commercials and prefer spending the time during commercials to do other things. For example, if a commercial break begins on a DPF, a viewer might prefer to switch views on the screen to browse or edit image files rather than to endure the commercials. However, the viewer is left to guess when the commercial break is over and he or she should switch back to the TV channel, which is inconvenient and not-in-time, and may cause viewers to miss a part of their favorite TV program.

BRIEF DESCRIPTION OF THE DRAWINGS

The components of the drawings are not necessarily drawn to scale, the emphasis instead being placed upon clearly illustrating the principles of a DPF with a PIP output function and method thereof. Moreover, in the drawings, like reference numerals designate corresponding parts throughout several views.

DETAILED DESCRIPTION OF THE EMBODIMENTS

Figure 1:
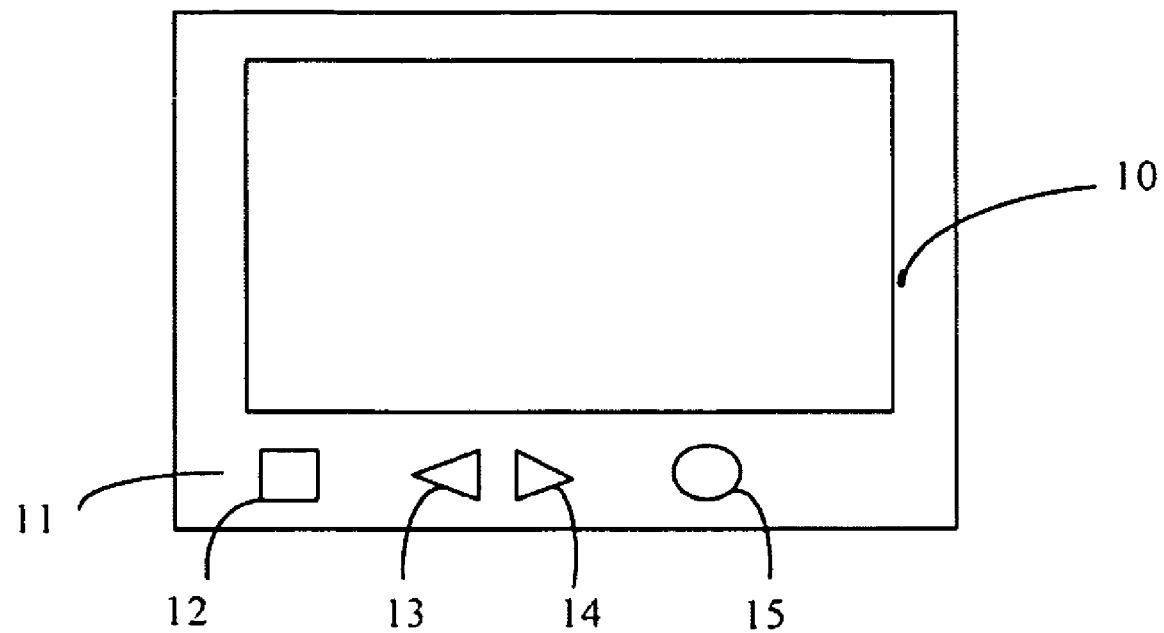
FIG. 1 is a front view of a DPF with a PIP output function in accordance with an exemplary embodiment of the present disclosure.

FIG. 1 is a front view of a DPF 10 with a PIP output function in accordance with an exemplary embodiment of the present disclosure.

The DPF 10 includes a control panel 11. The control panel 11 mainly includes a power button 12, a previous button 13, a next button 14 and a PIP button 15. The power button 12 is configured for powering on and powering off the DPF 10. The previous button 13 and the next button 14 are configured for selecting multimedia files for the DPF 10 to reproduce under a DPF mode of the DPF 10. The previous button 13 and the next button 14 are further configured for changing television (TV) channels under a TV mode of the DPF 10. The PIP button 15 is configured for activating a PIP output mode of the DPF 10.

Figure 2:
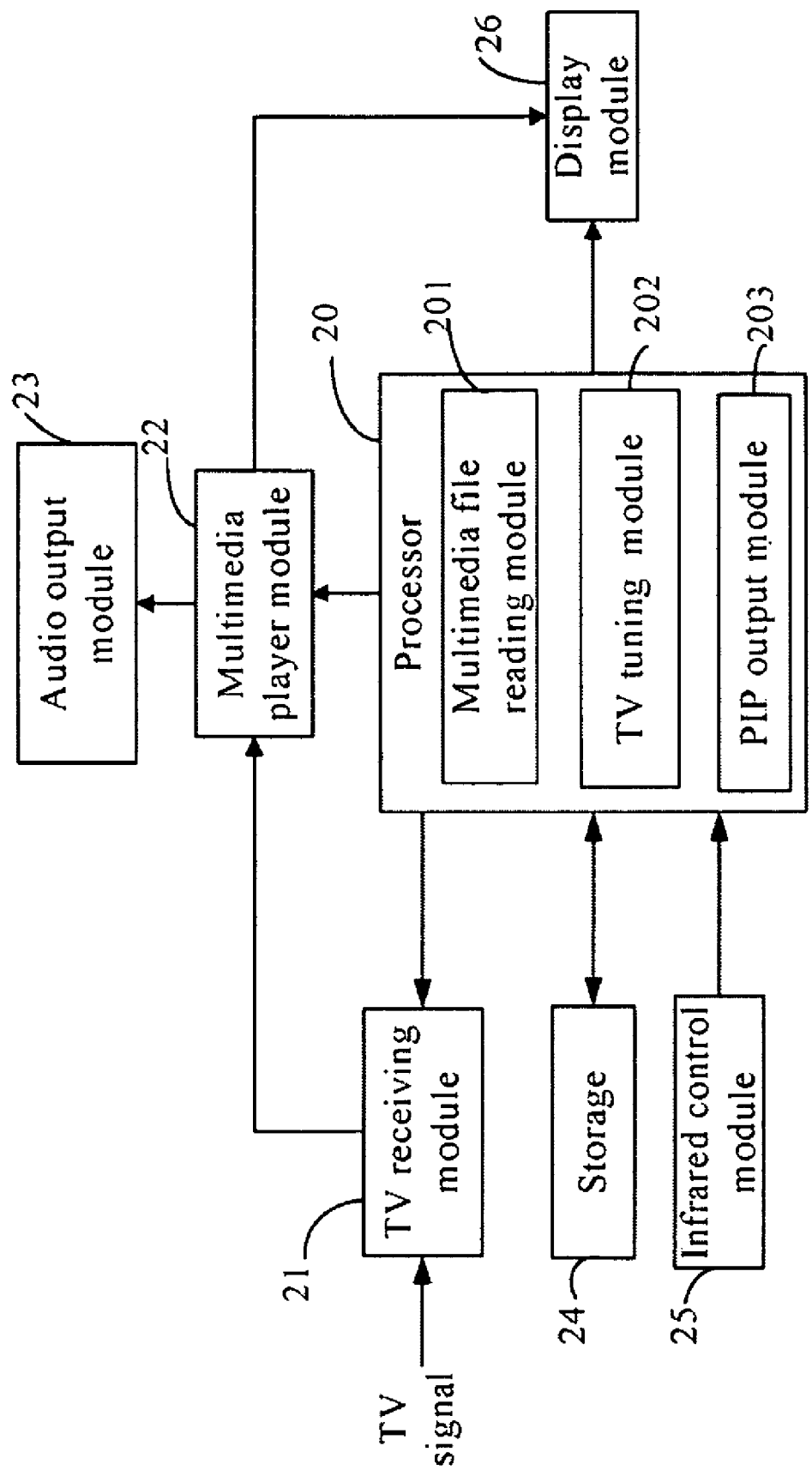
FIG. 2 is a block diagram of the DPF of FIG. 1 in accordance with an exemplary embodiment of the present disclosure.

FIG. 2 is a block diagram of the DPF 10 in accordance with an exemplary embodiment of the present disclosure.

The DPF 10 includes a processor 20 connected to a TV receiving module 21, a multimedia player module 22, a storage 24, and a display module 26, which are controlled by the processor 20.

The storage 24 is configured for storing multimedia files. The multimedia files may include image files, audio files, video files, and so on. When the DPF 10 is in the DPF mode, the processor 20 fetches the multimedia files from the storage 24 and transfers the multimedia files to the multimedia player module 22. The multimedia player module 22 then reproduces image/video data of the multimedia files on the display module 26. When the DPF 10 is in the TV mode, the TV receiving module 21 is controlled by the processor 20 to receive broadcast and transfer the contents of the broadcasts to the multimedia player module 22. The multimedia player module 22 then reproduces image/video data of the contents of the broadcasts on the display module 26. The multimedia player module 22 is connected to an audio output module 23 (e.g., a speaker) and the display module 26. The audio output module 23 is configured for outputting audio data of the multimedia files and the contents of the broadcasts.

The DPF 10 also includes an infrared control module 25. The infrared control module 25 is configured for receiving infrared control signals from a remote control (not shown) and converts the infrared control signals to digital serial signals. The digital serial signals are sent to the processor 20 and the processor 20 adjusts various parameters of the controllable modules according to the digital serial signals. The buttons on the control panel 11 can also be integrated with the remote control to control the operation of the DPF 10.

The processor 20 includes a multimedia file reading module 201, a TV tuning module 202, and a PIP output module 203.

The multimedia file reading module 201 is configured for fetching the multimedia files from the storage 24. The TV tuning module 202 is configured for tuning the TV receiving module 21 to receive broadcasts over different TV channels according to user input. The PIP output module 203 is configured for outputting the multimedia files and contents of the TV broadcasts on the display module 26 in a PIP output mode via the multimedia player module 22 upon receiving a PIP signal transferred from the PIP button 15.

Generally, according to an exemplary embodiment, under the DPF mode, the PIP output module 203 defines a PIP region on the display module 26 upon receiving the PIP signal. The TV tuning module 202 tunes the TV receiving module 21 to a selected TV channel. The PIP output module 203 outputs the multimedia files and the broadcast contents of the selected channel on the display module 26 in the PIP output mode via the multimedia player module 22.

Figure 3:
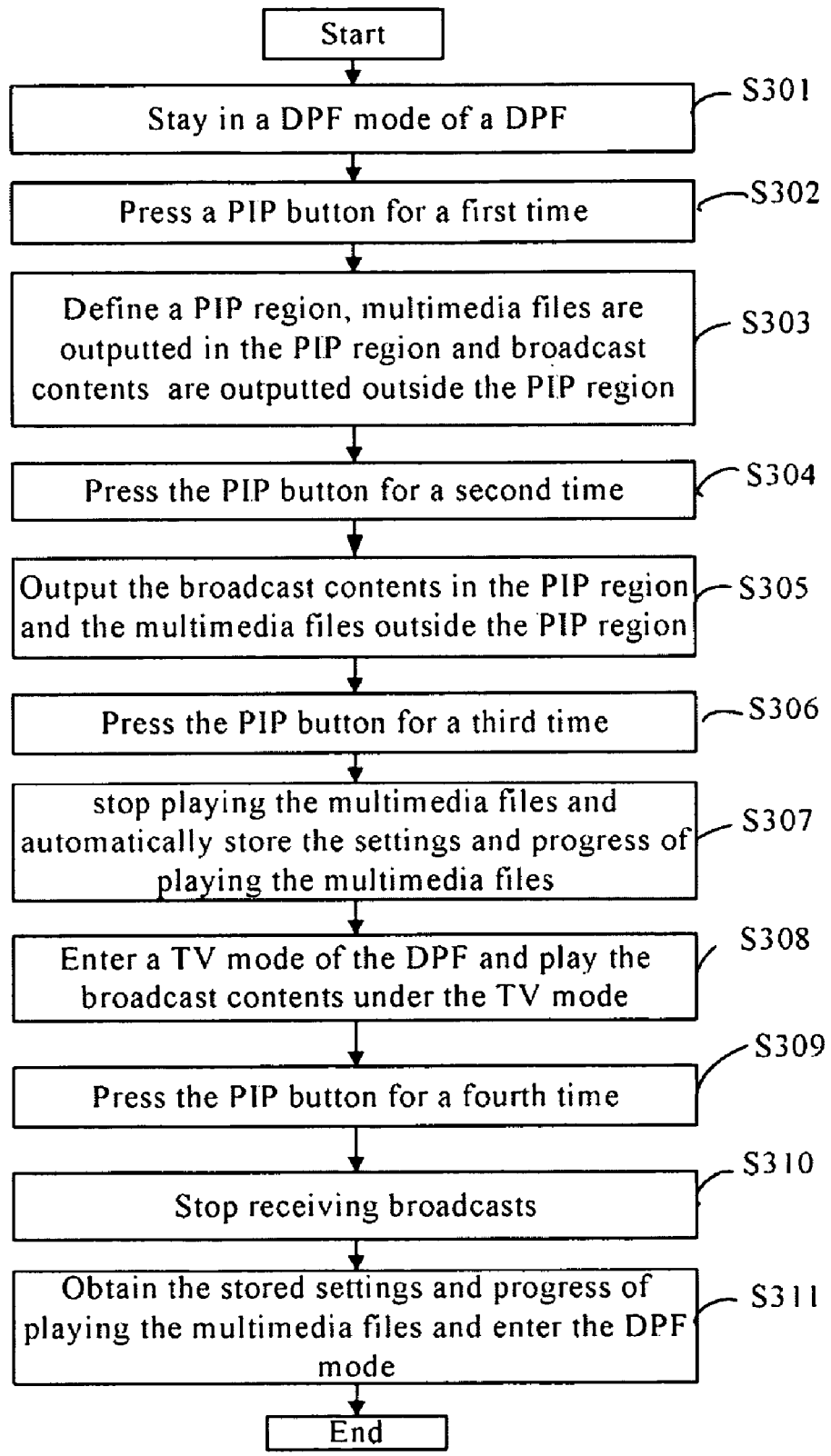
FIG. 3 is a flowchart of the DPF of FIG. 1 outputting multimedia files and broadcast contents in a PIP output mode in accordance with an exemplary embodiment of the present disclosure.

FIG. 3 is a flowchart of the DPF 10 outputting the multimedia files and broadcast contents in the PIP output mode in accordance with an exemplary embodiment of the present disclosure.

In step S301, the DPF 10 is in the DPF mode and plays the multimedia files.

In step S302, the PIP button 15 is pressed and generates a PIP signal. The PIP signal is transferred to the processor 20.

In step S303, upon receiving the PIP signal, the PIP output module 203 defines the PIP region at a predetermined area of the display module 26. The TV tuning module 202 tunes the TV receiving module 21 to a selected TV channel. The PIP output module 203 outputs the broadcast contents of the selected TV channel outside the PIP region and the multimedia files in the PIP region of the display module 26 via the multimedia player module 22. The PIP output module 203 signals the multimedia player module 22 to output the audio data of the broadcast contents, and not output the audio data of the multimedia files. At this time, the previous button 13 and the next button 14 are enabled for tuning to various TV channels.

In step S304, the PIP button 15 is pressed for a second time.

In step S305, the PIP output module 203 exchanges output regions of the multimedia files and the broadcast contents of a selected TV channel. That is, the multimedia files are outputted outside the PIP region and the broadcast contents are outputted in the PIP region of the display module 26 via the multimedia player module 22. At this time, the PIP output module 203 signals the multimedia player module 22 to output the audio data of the multimedia files, and not output the audio data of the broadcast contents. At this time, the previous button 12 and the next button 13 are enabled for controlling the playing of the multimedia files.

In step S306, the PIP button 15 is pressed for a third time.

In step S307, the PIP output module 203 signals the multimedia file reading module 201 to stop fetching the multimedia files from the storage 24. The settings and progress of playing the multimedia files are automatically stored in the storage 24.

In step S308, the PIP output module 203 outputs the broadcast contents on the display module 26 via the multimedia player module 22. The broadcast contents take up the full screen of the display module 26. The DPF 10 enters the TV mode.

In step S309, the PIP button 15 is pressed for a fourth time.

In step S310, the PIP output module 203 signals the TV tuning module 202, and the TV tuning module 202 controls the TV receiving module 21 to stop receiving the broadcasts.

In step S311, the processor 10 fetches the stored settings and progress of playing the multimedia files from the storage 24 and resumes the play of the multimedia files. The DPF 10 enters the DPF mode.

Figure 4:
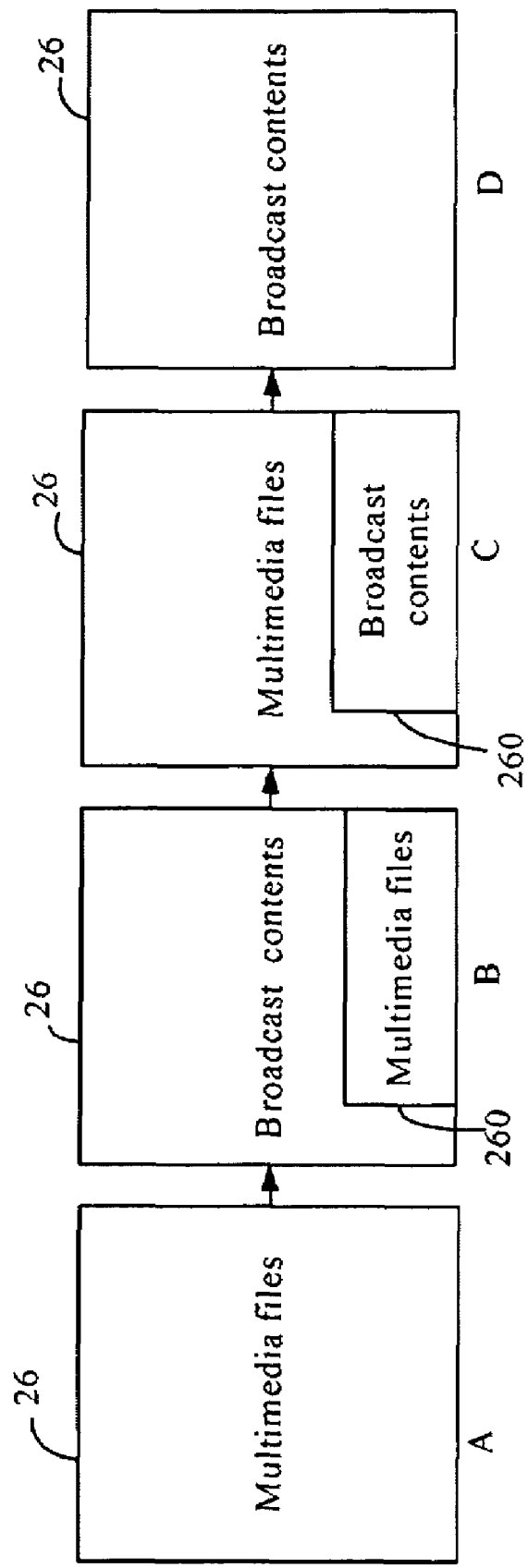
FIG. 4 is an schematic view of the DPF of FIG. 1, illustrating the multimedia files and broadcast contents outputted in the PIP output mode in accordance with an exemplary embodiment of the present disclosure.

FIG. 4 is a schematic view of the DPF 10, illustrating the multimedia files and broadcast contents outputted in the PIP output mode in accordance with an exemplary embodiment of the present disclosure.

Firstly, at stage "A", the PIP mode is not activated and the DPF 10 is in the DPF mode. The multimedia files are outputted using the full screen of the display module 26. Users may view and edit the multimedia files through operating buttons on the control panel 11. At stage "B", the PIP button 15 is pressed for a first time and the PIP mode is activated. A rectangular PIP region 260 appears and takes up a predetermined area of the display module 26. The broadcast contents are outputted outside the PIP region 260 and the multimedia files are outputted in the PIP region 260. The users may operate the previous button 13 and the next button 14 to tune into a TV channel of their choice. At stage "C", the PIP button 15 is pressed for a second time, as a result, output regions for the multimedia files and the broadcast contents of the users' tuned TV channel are exchanged, and the users again may view and edit the multimedia files through operating buttons on the control panel 11. In addition, the users can keep an eye on the broadcast contents of the users' tuned TV channel, and easily know when their show begins. At stage "D", the PIP button 15 is pressed for a third time, and the PIP mode is deactivated. The rectangular PIP region 260 disappears and the DPF 10 enters the TV mode. The broadcast contents of the users' tuned TV channel are outputted through the full screen of the display module 26.

By employing the PIP output function, the DPF 10 provides a PIP region for users to monitor broadcasts while using other function of the DPF 10, and the users will not miss their shows.

Although the present disclosure has been specifically described preferred embodiments and method thereof, the invention is not to be construed as being limited thereto. Various changes or modifications may be made to the embodiments without departing from the scope and spirit of the invention.

What is claimed is:

1. A digital photo frame (DPF) with a picture-in-picture (PIP) output function comprising a DPF mode and a television (TV) mode, the DPF comprising:
    a TV receiving module configured for receiving broadcasts over different TV channels;
    a PIP button configured for activating a PIP output mode of the DPF;
    a processor comprising:
        a TV tuning module configured for tuning the TV receiving module to a selected TV channel; and
        a PIP output module configured for defining a PIP region on a display module of the DPF upon receiving a PIP signal transferred from the PIP button, and outputting the multimedia files and broadcast contents of the selected TV channel on the display module in the PIP output mode, exchanging output regions for the multimedia files and the broadcast contents of the selected TV channel according to the signals transferred from the PIP button under the PIP output mode, automatically storing the settings and progress of playing the multimedia files when the PIP output module switches the multimedia files to the PIP region according to the signals transferred from the PIP button under the PIP mode, and further fetching the stored settings and progress of playing the multimedia files and resuming the play of the multimedia files when the DPF is switched from the PIP output mode to the DPF mode.

2. The DPF as described in claim 1, wherein in the PIP output mode the multimedia files are outputted in the PIP region, and the broadcast contents of the selected TV channel are outputted outside the PIP region.

3. The DPF as described in claim 1, wherein in the PIP output mode the broadcast contents of the selected TV channel are outputted in the PIP region, and the multimedia files are outputted outside the PIP region.

4. The DPF as described in claim 2, further comprising a control panel configured for controlling the playing of the multimedia files outputted outside the PIP region.

5. The DPF as described in claim 3, further comprising a control panel configured for controlling the playing of the broadcast contents of the selected TV channels outputted outside the PIP region.

6. The DPF as described in claim 1, wherein the PIP output module is further configured for controlling the DPF to exit the PIP output mode according to the signals transmitted from the PIP button under the PIP output mode.

7. The DPF as described in claim 1, further comprising a storage configured for storing multimedia files, wherein the processor further comprises a multimedia file reading module configured for accessing the storage.

8. The DPF as described in claim 1, further comprising an infrared control module configured for controlling the operation of the DPF remotely.

9. A method to apply a picture-in-picture (PIP) output function on a digital photo frame (DPF) comprising a DPF mode and a television (TV) mode, the method comprising:

activating a PIP output mode of the DPF;

defining a PIP region on a display module of the DPF;

receiving broadcasts of a selected TV channel;

outputting the multimedia files and the broadcast contents of the selected TV channel in the PIP output mode;

exchanging output regions for the multimedia files and the broadcast contents of the selected TV channel in response to control input under the PIP output mode;

automatically storing the settings and progress of playing the multimedia files when the multimedia files are output to the PIP region in response to control input under the PIP output mode; and fetching the stored settings and progress of playing the multimedia files and resuming the play of the multimedia files when the DPF is switched from the PIP output mode to the DPF mode.

10. The method as described in claim 9, wherein the multimedia files are outputted in the PIP region and the broadcast contents of the selected TV channel are outputted outside the PIP region before the output regions are exchanged, and the multimedia files are outputted outside the PIP region and the broadcast contents of the selected TV channel are outputted in the PIP region after the output regions are exchanged.

11. The method as described in claim 10, further comprising:

exiting the PIP output mode and entering the TV mode.

* * * * *